US012776984B2

(12) United States Patent
Manickam et al.

(10) Patent No.: US 12,776,984 B2
(45) Date of Patent: Oct. 27, 2026

(54) INFLUENCING OF HIGH AVAILABILITY SWITCHOVER FOR SDWAN

(71) Applicant: Cisco Technology, Inc., San Jose, CA (US)

(72) Inventors: Arul Murugan Manickam, San Jose, CA (US); Pritam Baruah, Fremont, CA (US); Sireesha Yeruva, Fremont, CA (US); Vishali Somaskanthan, Rajakilpakkam (IN); Michael Tracy, Petaluma, CA (US)

(73) Assignee: Cisco Technology, Inc., San Jose, CA (US)

( * ) Notice: Subject to any disclaimer, the term of this patent is extended or adjusted under 35 U.S.C. 154(b) by 90 days.

(21) Appl. No.: 19/020,794

(22) Filed: Jan. 14, 2025

(65) Prior Publication Data

US 2026/0067207 A1 Mar. 5, 2026

(30) Foreign Application Priority Data

Aug. 31, 2024 (IN) ............................ 202441065923

(51) Int. Cl.
*H04L 45/00* (2022.01)
*H04L 1/1607* (2023.01)
*H04L 45/02* (2022.01)

(52) U.S. Cl.
CPC ............ *H04L 45/54* (2013.01); *H04L 1/1614* (2013.01); *H04L 45/026* (2013.01)

(58) Field of Classification Search
CPC ......... H04L 45/54; H04L 45/22; H04L 45/28; H04L 41/0663; H04L 41/5012; H04L 43/0805; G06F 11/2033; H04W 88/06
See application file for complete search history.

(56) References Cited

U.S. PATENT DOCUMENTS

| | | | | |
|---|---|---|---|---|
| 10,560,379 | B1 * | 2/2020 | Ghosh | H04L 43/0805 |
| 11,716,279 | B2 * | 8/2023 | Manickam | H04L 41/0806 709/224 |
| 2015/0063360 | A1 * | 3/2015 | Thakkar | H04L 45/745 370/400 |
| 2017/0060708 | A1 * | 3/2017 | Narang | G06F 11/2033 |
| 2018/0115457 | A1 | 4/2018 | Bonomi et al. | |
| 2018/0316607 | A1 * | 11/2018 | Jiang | H04L 45/74 |

(Continued)

FOREIGN PATENT DOCUMENTS

CN 115529224 A 12/2022

*Primary Examiner* — Alex Tran
(74) *Attorney, Agent, or Firm* — Polsinelli P.C.

(57) ABSTRACT

In one aspect, a method includes determining, at a first node in an active state, a local wide area network (WAN) tunnel state of a WAN tunnel of the first node based on a forwarding table of the first node; determining, at the first node, a local direct internet access (DIA) path state of a DIA path of the first node based on a DIA tracker; receiving, at the first node, state information associated with a second node, wherein the state information includes a far-end WAN tunnel state and a far-end DIA path state associated with the second node; comparing, at the first node, the local WAN tunnel state and the local DIA path state with the far-end WAN tunnel state and the far-end DIA path state of the second node, respectively to yield a comparison; and based on the comparison, switching, by the first node, to a standby state.

20 Claims, 7 Drawing Sheets

(56) References Cited

U.S. PATENT DOCUMENTS

| | | | | |
|---|---|---|---|---|
| 2020/0127884 | A1 | 4/2020 | Fan et al. | |
| 2022/0200885 | A1* | 6/2022 | Bajaj | H04L 41/0663 |
| 2025/0031124 | A1* | 1/2025 | Kadam | H04W 12/088 |

* cited by examiner

INDEX TABLE 502

| Far-end WAN | Far-end DIA | Local WAN | Local DIA | Bitmap | Final Role |
|---|---|---|---|---|---|
| 0 | 0 | 0 | 0 | 0 | HA Role |
| 0 | 0 | 0 | 1 | 1 | HA Role |
| 0 | 0 | 1 | 0 | 2 | HA Role |
| 0 | 0 | 1 | 1 | 3 | HA Role |
| 0 | 1 | 0 | 0 | 4 | HA' Role |
| 0 | 1 | 0 | 1 | 5 | HA Role |
| 0 | 1 | 1 | 0 | 6 | HA Role |
| 0 | 1 | 1 | 1 | 7 | HA Role |
| 1 | 0 | 0 | 0 | 8 | HA' Role |
| 1 | 0 | 0 | 1 | 9 | HA' Role |
| 1 | 0 | 1 | 0 | 10 | HA Role |
| 1 | 0 | 1 | 1 | 11 | HA Role |
| 1 | 1 | 0 | 0 | 12 | HA' Role |
| 1 | 1 | 0 | 1 | 13 | HA' Role |
| 1 | 1 | 1 | 0 | 14 | HA' Role |
| 1 | 1 | 1 | 1 | 15 | HA Role |

R1 R2
HA ROLE = {ACTIVE, STANDBY}
HA' ROLE = {STANDBY, ACTIVE}

INFLUENCING OF HIGH AVAILABILITY SWITCHOVER FOR SDWAN

CROSS-REFERENCE TO RELATED APPLICATIONS

This application claims priority to Indian Provisional Patent Application No. 202441065923, filed Aug. 31, 2024 and entitled, "DETERMINISTIC AND INTENT BASED INFLUENCING OF HIGH AVAILABILITY SWITCHOVER FOR SDWAN", the contents of which are hereby incorporated by reference in their entirety.

BACKGROUND

In a network of interconnected devices and services, designing an implementing a system and architecture for reliable network routing is important in order to reduce downtime and continuous availability of services. In this context, High Availability (HA) and seamless failover on failure are important in business-critical applications. To mitigate disruptions from failure, many vendors offer Active/Hot-Standby, or Active (master)/Active (subordinate) model for HA and seamless failover. In these implementations, stateful features are expected to run only on an active node and is an active router fails, the standby router will become active and take over traffic forwarding.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DETAILED DESCRIPTION

Figure 1:
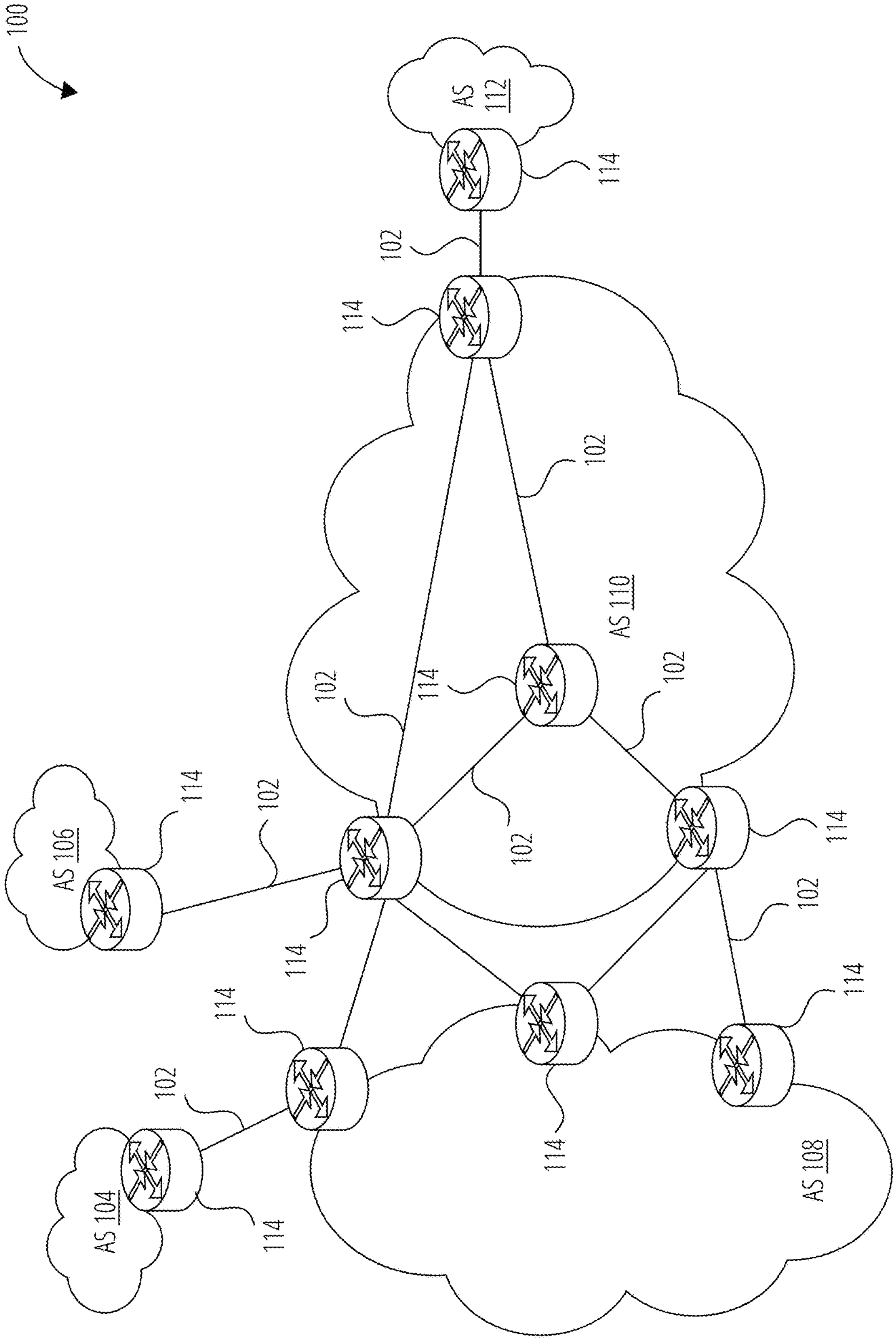
FIG. 1 illustrates an example communication network including one or more autonomous systems (ASes) in accordance with some aspects of the present disclosure.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

As used herein the term "configured" shall be considered to interchangeably be used to refer to configured and configurable, unless the term "configurable" is explicitly used to distinguish from "configured". The proper understanding of the term will be apparent to persons of ordinary skill in the art in the context in which the term is used.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Aspects of the present disclosure facilitate accurate switchover in an SDWAN environment. Rather than utilizing counters decremented based on failure types, disclosed examples enable HA routers to communicate their exit statuses to each other and to reach a switchover decision by applying an algorithm to local and far-end exit statuses. This improves upon current switchover methods, which use decrements based on individual failures that are not indicative of a failure severity.

In one aspect, a method includes determining, at a first node in an active state, a local wide area network (WAN) tunnel state of a WAN tunnel of the first node based on a forwarding table of the first node; determining, at the first node, a local direct internet access (DIA) path state of a DIA path of the first node based on a DIA tracker; receiving, at the first node, state information associated with a second node, wherein the state information includes a far-end WAN tunnel state and a far-end DIA path state associated with the second node; comparing, at the first node, the local WAN tunnel state and the local DIA path state with the far-end WAN tunnel state and the far-end DIA path state of the second node, respectively to yield a comparison; and based on the comparison, switching, by the first node, to a standby state.

In another aspect, the comparison is based on a state table that includes a set of roles defined by possible combinations of the local WAN tunnel state, the local DIA path state, the far-end WAN tunnel state, and the far-end DIA path state.

In another aspect, comparing the local WAN tunnel state and the local DIA path state with the far-end WAN tunnel state and the far-end DIA path state of the second node includes applying an algorithm that is uniform across the first node and the second node.

In another aspect, the state table comprises an index table, wherein an index of the index table comprises a bitmap indexing possible combinations of the local WAN tunnel state, the local DIA path state, the far-end WAN tunnel state, and the far-end DIA path state.

In another aspect, the method further includes transmitting, to the second node, local state information, wherein the local state information includes the local WAN tunnel state and the local DIA path state and wherein the local state information is useable by the second node to compare, at the second node, the local WAN tunnel state and the local DIA path state with the far-end WAN tunnel state and the far-end DIA path state, respectively, to yield a second comparison; and based on the second comparison, switch a state of the second node to an active state.

In another aspect, the state information associated with the second node is received at the first node via a hello or a keepalive transmitted from the second node to the first node.

In another aspect, the first node comprises an exit state evaluation module for determining the local wide area network (WAN) tunnel state and the local direct internet access (DIA) path state.

In one aspect, a router includes at least one memory configured to store computer-readable instructions; and one or more processors. The one or more processors configured to execute the computer-readable instructions to determine a local wide area network (WAN) tunnel state of a WAN tunnel of the router based on a forwarding table of the router, the router being in an active state; determine a local direct internet access (DIA) path state of a DIA path of the router based on a DIA tracker; receive state information associated with a remote router, wherein the state information comprises a far-end WAN tunnel state and a far-end DIA path state of the remote router; compare the local WAN tunnel state and the local DIA path state with the far-end WAN tunnel state and the far-end DIA path state of the remote router, respectively, to yield a comparison; and based on the comparison, switch the router to a standby state.

In one aspect, one or more non-transitory computer-readable media include computer-readable instructions that, when executed by one or more processors of a router, cause the router to determine a local wide area network (WAN) tunnel state of a WAN tunnel of the router based on a forwarding table of the router, the router being in an active state; determine a local direct internet access (DIA) path state of a DIA path of the router based on a DIA tracker; receive state information associated with a remote router, wherein the state information comprises a far-end WAN tunnel state and a far-end DIA path state of the remote router; compare the local WAN tunnel state and the local DIA path state with the far-end WAN tunnel state and the far-end DIA path state of the remote router, respectively, to yield a comparison; and based on the comparison, switch the router to a standby state.

Example Embodiments

The disclosed technology addresses the need in the art for strategies to improve handling failures in an SDWAN environment beyond using a simple numerical scoring comparing mechanism. In existing implementations of HA, failures are detected by some form of tracking and each failure type causes a corresponding decrement in that device's score. There can be multiple failures like prefix unreachability, interface down, device failure, etc. Each of these failure types may be tracked individually, where a configurable decrement value and the resulting score influences switchover. In SDWAN applications, not switching over can greatly increase the likelihood of black holing or application degradation or increased cost (e.g., due to using undesired circuits).

Table 1 below illustrates an example of an existing HA switchover scheme based on individually tracked parameters.

| DEVICE-A | DEVICE-B |
|---|---|
| Score = 255 | Score = 250 |
| Become Active | Become Standby |
| failure1 detected (−10) | |
| Score = 255 − 10 = 245 | Informed of DEVICE-A's score (245) |
| Switchover (A.245 < B.250) | Switchover (A.245 < B.250) |
| Become Standby | Become Active |
| | failure2 detected (−4) |
| Informed of DEVICE-B's score (246) | Score = 250 − 4 = 246 |
| No Switchover (A.245 < B.246) | No Switchover (A.245 < B.246) |

In example Table 1, two types of trackable failures are used (e.g., failure1 and failure2). Each failure has an associated decrement value (e.g., failure1=10 and failure2=4).

Consider an example scenario where Device-A has a current score of 255 and Device-B has a current score of 250. Because Device-A has a higher score than Device-B, Device-A becomes active while Device-B enters a standby mode.

At this time, failure1 may be detected at Device-A, resulting in the score of Device-A being decremented by 10 to 245. Device-A, knowing that Device-B has a score of 250, switches over to the standby mode because Device-A's current score of 245 is less than 250. At the same time, Device-B switches over to an active state.

At this time, failure2 maybe detected at Device-B resulting in the score of Device-B being decremented by 4 to 246. Detection of failure2 does not result in any switchover in the corresponding states of Device-A and Device-B because the score of Device-B (e.g., 246) remains higher than the score of Device-A (e.g., 245).

Table 1 illustrates an example of individually tracked failures.

However, the above-described switchover mechanisms do not work in SDWAN environments, because in SDWAN environments an individual failure is unable to accurately predict the severity of the problem causing the failure. Further, the switchover influencer, based on example mechanisms described above, is heuristic such that switchover may or may not happen because it is based solely on comparing a score derived from the individual failures with a threshold.

In SDWAN environments, there are two main types of exits, direct internet access (DIA) and wide area network (WAN), and there are multiple underlying failures that determine the state of both exits. For example, there can be multiple DIA exits and WAN exits and multiple types of failures within each exit. Thus, for example, if DIA or WAN, or part of DIA or WAN, is not available on one device, then that device should not remain in an active state. In the decrement method that may be implemented in current systems, setting the decrement value becomes an intractable problem for network administrators in an SDWAN environment. This, results in a situation in which switchover is nondeterministic and inconsistent with the primary SDWAN intents of DIA and WAN.

Disclosed systems and methods mitigate these issues by providing a technique for handling failures in which DIA and WAN reachability become the unit of granularity for switchover influence rather than individual failures like prefix unreachability and interface down. For example, each device determines DIA availability or WAN availability based on tracking individual failures. Then the status of DIA availability and WAN availability is shared with the other devices, rather than the score of each device. Each device can use the statuses of DIA and WAN directly in its switchover influencer algorithm.

Hereinafter and with reference to FIGS. 1 and 2, non-limiting network architectures in which example embodiments of the present disclosure may be applied, will be described.

A computer network is a geographically distributed collection of nodes interconnected by communication links and segments for transporting data between end nodes, such as personal computers and workstations, or other network devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other.

Since management of interconnected computer networks can prove burdensome, smaller groups of computer networks may be maintained as routing domains or autonomous systems. An Autonomous System (AS) is a network or group of networks under common administration and with common routing policies. A typical example of an AS is a network administered and maintained by an Internet Service Provider (ISP). Customer networks, such as universities or corporations, connect to the ISP, and the ISP routes the network traffic originating from the customer networks to network destinations that may be in the same ISP or may be reachable only through other ISPs.

To facilitate the routing of network traffic through one or more ASes, the network elements of the ASes need to exchange routing information to various network destinations. Border Gateway Protocol (BGP) is an Exterior Gateway Protocol (EGP) that is used to exchange routing information among network elements (e.g., routers) in the same or different ASes. A computer host that executes a BGP process is typically referred to as a BGP host or a BGP network device. To exchange BGP routing information, two BGP hosts, or peers, first establish a transport protocol connection with one another. Initially, the BGP peers exchange messages to open a BGP session, and, after the BGP session is open, the BGP peers exchange their entire routing information. Thereafter, only updates or changes to the routing information are exchanged, or advertised, between the BGP peers. The exchanged routing information is maintained by the BGP peers during the existence of the BGP session.

The networks within an AS are typically coupled together by conventional "intradomain" routers configured to execute intradomain routing protocols and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 illustrates an example communication network including one or more autonomous systems (ASes) in accordance with some aspects of the present disclosure. FIG. 1 is a schematic block diagram of an example communication network 100. Communication network 100 may include a set of autonomous systems (AS) such as AS 104, AS 106, AS 108, AS 110, and AS 112. Each AS may be associated with one or more network devices such as network devices 114 interconnected by various methods of communication. For instance, links 102 may be any suitable combination of wired links and shared media (e.g., wireless links, Internet Exchange Points, etc.) via which network devices 114 may be connected to one another. Network devices 114 may be any type of known or to be developed device capable of connecting to and operating in a network including, but not limited to, routers, computers, etc. Configuration of communication network 100 and consequently types and numbers of components thereof such as network devices 114 and links 102, as shown in FIG. 1, are merely exemplary and shown in a simplified manner for ease of understanding and thus are non-limiting.

Data packets (e.g., traffic and/or messages sent between network devices 114) may be exchanged among network devices 114 of communication network 100 using known or to be developed network communication protocols (e.g., wired and/or wireless protocols, shared-media protocols, etc.).

Communication network 100 may be positioned in any suitable network environment or communications architecture that operates to manage or otherwise direct information using any appropriate routing protocol or data management standard. For example, communication network 100 may be provided in conjunction with a border gateway protocol (BGP).

As noted above, an AS may be a collection of connected Internet Protocol (IP) routing network devices such as network devices 114 under the control of one or more network operators that presents a common, clearly defined routing policy to a network (e.g., the Internet). Usually, an AS comprises network devices 114 that are established on the edge of the system, and that serve as the system's ingress and egress points for network traffic. Accordingly, network devices 114 may be considered edge network devices, border routers, or core network devices within the respective AS. These network devices typically, but not always, are routers or any other element of network infrastructure suitable for switching or forwarding data packets according to a routing protocol or switching protocol. For the purposes of the present disclosure, network devices 114 located within an AS may alternatively be referred to as "forwarding network devices" or "intermediate network devices." Moreover, for illustration purposes, AS 104, AS 106, AS 108, AS 110, and/or AS 112 are shown with a limited number of network devices 114. However, the present disclosure is not limited thereto, and each AS may include more or less network devices than that shown in FIG. 1.

Each one of AS 104, AS 106, AS 108, AS 110, and/or AS 112 may be associated with an Internet Service provider (ISP). Even though there may be multiple ASes supported by a single ISP, the Internet only sees the routing policy of the ISP. That ISP must have an officially registered Autonomous System Number (ASN). As such, a unique ASN is allocated to each AS for use in BGP routing. ASNs are important primarily because they uniquely identify each network on the Internet.

To facilitate the routing of network traffic through the ASes, or more specifically, network devices 114 within the ASes, the network devices may exchange routing information to various network destinations. As described above, BGP may be used to exchange routing and reachability information among network devices 114 within a single AS or between different ASes. One example of BGP is BGPv4, as defined in Request for Comments (RFC) 1771 of the Internet Engineering Task Force (IETF). The BGP logic of a router may be used by the data collectors to collect BGP AS path information, e.g., the "AS_PATH" attribute, as described further below, from BGP tables of border routers of an AS, to construct paths to prefixes.

To exchange BGP routing information, two BGP hosts (network devices 114), or peers, first establish a transport protocol connection with one another. Initially, the BGP peers exchange messages to open a BGP session, and, after the BGP session is open, the BGP peers exchange their entire routing information. Thereafter, in certain embodiments, only updates or changes to the routing information, e.g., the "BGP UPDATE" attribute, are exchanged, or advertised, between the BGP peers. The exchanged routing information is maintained by the BGP peers during the existence of the BGP session.

The BGP routing information may include the complete route to each network destination, e.g., "destination network device," that is reachable from a BGP host. A route, or path, comprises an address destination, which is usually represented by an address prefix (also referred to as prefix), and information that describe the path to the address destination. The address prefix may be expressed as a combination of a network address and a mask that indicates how many bits of the address are used to identify the network portion of the address. In Internet Protocol version 4 (IPv4) addressing, for example, the address prefix can be expressed as "9.2.0.2/16". The "/16" indicates that the first 16 bits are used to identify the unique network leaving the remaining bits in the address to identify the specific hosts within this network.

A path joining a plurality of ASes, e.g., links 102, may be referred to as an "AS_PATH." The AS_PATH attribute indicates the list of ASes that must be traversed to reach the address destination. For example, as illustrated in FIG. 1, AS 112 may store an AS_PATH attribute of "104 106 110 112" where the address destination is AS 112 (or a particular IP address within AS 112). Here, the AS_PATH attribute indicates that the path to the address destination of AS 112 from AS 108 passes through AS 104, AS 106 and AS 110, in that order.

Although it may be preferable that all network devices 114 in the respective one of AS 104, AS 106, AS 108, AS 110, and AS 112 be configured according to BGP, in a real-world implementation, it may be unlikely that each network device communicates using BGP. Thus, the disclosed embodiments are applicable to scenarios where all network devices 114 in communication network 100 are configured according to BGP, as well as scenarios where only a subset of network devices 114 is/are configured as such. Moreover, between any of the ASes, there may be a single communication path via one of links 102, e.g., between AS 104 and AS 108, as shown in FIG. 1, or there may be multiple communication paths via links 102, e.g., between AS 108 and AS 110. Thus, the disclosed example are applicable to both cases, as described in further detail below.

Moreover, a security extension to the BGP has been developed, referred to as BGPSEC, which provides improved security for BGP routing. BGP does not include mechanisms that allow an AS to verify the legitimacy and authenticity of BGP route advertisements. The Resource Public Key Infrastructure (RPKI) provides a first step towards addressing the validation of BGP routing data. BGPSEC extends the RPKI by adding an additional type of certificate, referred to as a BGPSEC router certificate, that binds an AS number to a public signature verification key, the corresponding private key of which is held by one or more BGP speakers within this AS. Private keys corresponding to public keys in such certificates can then be used within BGPSEC to enable BGP speakers to sign on behalf of their AS. The certificates thus allow a relying party to verify that a BGPSEC signature was produced by a BGP speaker belonging to a given AS. Thus, a goal of BGPSEC is to use signatures to protect the AS Path attribute of BGP update messages so that a BGP speaker can assess the validity of the AS Path in update messages that it receives.

It should be understood, however, that the embodiments for implementing AS Path security disclosed herein are not limited to BGPSEC; certain embodiments may, additionally or alternatively, be applicable to other suitable protocols, including, for example, SoBGP, S-BGP, and PGPBGP, to name just a few.

Furthermore, the present disclosure is not limited to BGPv4 or more generally BGP being used for exchanging route and reachability information. Any other known or to be developed route and reachability information exchange mechanism and protocol may be used and thus falls within the scope of the present disclosure.

Figure 2:
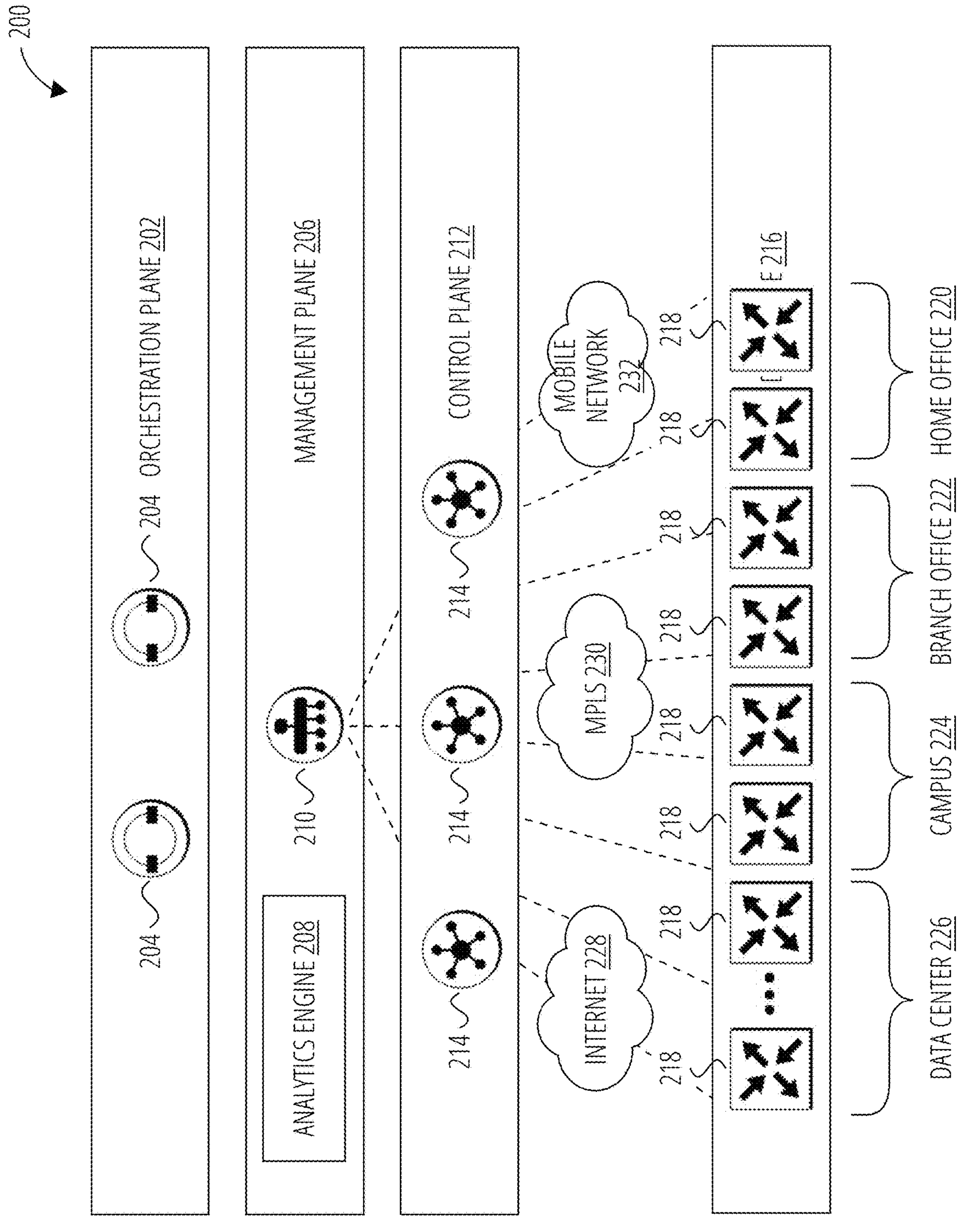
FIG. 2 illustrates an example of a high-level network architecture in accordance with some aspects of the present disclosure.

FIG. 2 illustrates an example of a high-level network architecture in accordance with some aspects of the present disclosure. A non-limiting example of an implementation of network architecture 200 shown in FIG. 2 is the Cisco® SD-WAN architecture. However, one of ordinary skill in the art will understand that, for network architecture 200 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, network architecture 200 can comprise an orchestration plane 202, a management plane 206, a control plane 212, and a data plane 216. Orchestration plane 202 can assist in the automatic on-boarding of edge network devices 218 (e.g., switches, routers, etc.) in an overlay network. Orchestration plane 202 can include one or more physical or virtual network orchestrator appliances such as network orchestrator appliances 204. Network orchestrator appliances 204 can perform the initial authentication of edge network devices 218 and orchestrate connectivity between devices of control plane 212 and data plane 216. In some examples, network orchestrator appliances 204 can also enable communication of devices located behind Network Address Translation (NAT). In some embodiments, physical or virtual Cisco® SD-WAN vBond appliances can operate as network orchestrator appliances 204.

Management plane 206 can be responsible for central configuration and monitoring of a network. Management plane 206 can include analytics engine 208 and one or more physical or virtual network management appliances such as network management appliances 210. In some embodiments, network management appliances 210, based on one or more outputs of analytics engine 208, can provide centralized management of the network via a graphical user interface to enable a user to monitor, configure, and maintain edge network devices 218 and links (e.g., internet transport network 228, MPLS network 230, 4G/Mobile network 232) in an underlay and overlay network. Network management appliances 210 can support multi-tenancy and enable centralized management of logically isolated networks associated with different entities (e.g., enterprises, divisions within enterprises, groups within divisions, etc.). Alternatively or in addition, network management appliances 210 can be a dedicated network management system for a single entity. In some embodiments, physical or virtual Cisco® SD-WAN vManage appliances can operate as network management appliances 210.

Control plane 212 can build and maintain a network topology and make decisions on where traffic flows. Control plane 212 can include one or more physical or virtual network control appliances such as network control appliances 214. Network control appliances 214 can establish secure connections to each edge network device 218 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, network control appliances 214 can operate as route reflectors. Network control appliances 214 can also orchestrate secure connectivity in data plane 216 between and among edge network devices 218. For example, in some embodiments, network control appliances 214 can distribute crypto key information among edge network devices 218. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as network control appliances 214.

Data plane 216 can be responsible for forwarding packets based on decisions from control plane 212. Data plane 216 can include edge network devices 218, which can be physical or virtual edge network devices. Edge network devices 218 can operate at the edges various network environments of an organization, such as in one or more data centers 226, campus networks 224, branch office networks 222, home office networks 220, and so forth, or in the cloud (e.g., Infrastructure as a Service (IaaS), Platform as a Service (PaaS), SaaS, and other cloud service provider networks). Edge network devices 218 can provide secure data plane connectivity among sites over one or more WAN transports, such as via one or more internet transport networks such as internet transport network 228 (e.g., Digital Subscriber Line (DSL), cable, etc.), MPLS networks 230 (or other private packet-switched network (e.g., Metro Ethernet, Frame Relay, Asynchronous Transfer Mode (ATM), etc.), mobile networks 232 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.);

Public Switched Telephone Network (PSTN), Integrated Services Digital Network (ISDN), or other private circuit-switched network; small aperture terminal (VSAT) or other satellite network; etc.). Edge network devices 218 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as edge network devices 218.

Figure 3:
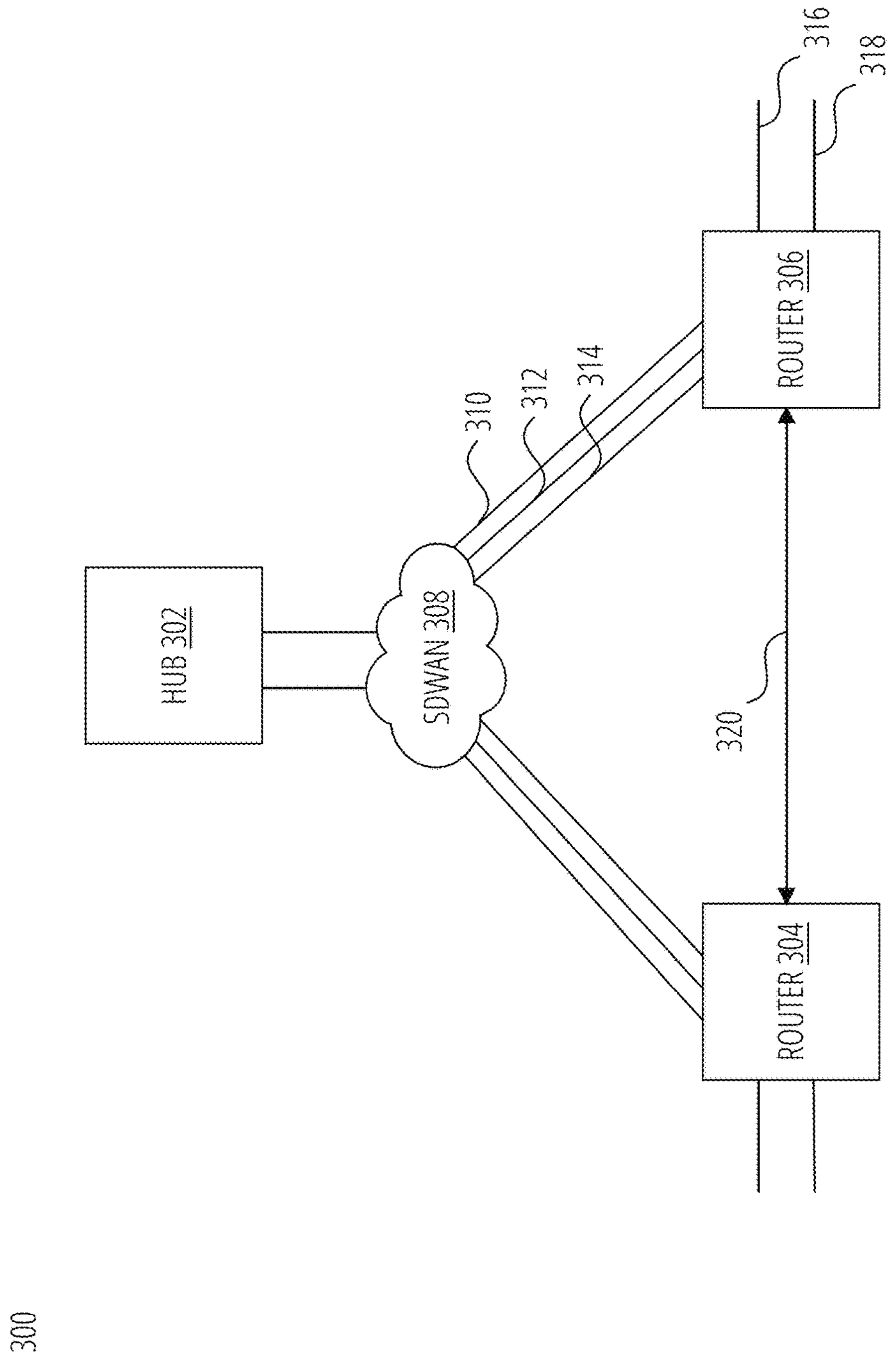
FIG. 3 illustrates an example environment for implementing HA switchover for SDWAN in accordance with some aspects of the present disclosure.

FIG. 3 illustrates an example environment for implementing HA switchover for SDWAN in accordance with some aspects of the present disclosure. Environment 300 can be, for example, part of communication network 100 or network architecture 200. As discussed above, switchover can be determined by applying an algorithm that takes into account the exit states of one or more of remaining routers.

Environment 300 can include a router 304 and a router 306, forming a cluster. Number of routers and clusters is not limited to that shown in FIG. 3. A cluster may have more than two routers and the number of clusters maybe more than one. Router 304 and router 306 can form a HA pair of routers where one router is in an active state and the other router is in a standby state. Router 304 and Router 306 can communicate, via the SDWAN 308, with a hub 302 for receiving and routing network traffic. Additionally, router 304 and router 306 can communicate with each other via HA interconnect 320, for example, using hello messages, keepalives, etc., HA interconnect 320 enables each router to communicate its local exit statuses to the other router. Thus, router 304 and router 306 can know their own local exit statuses as well as the far-end exit status of the other router.

In some examples, each of router 304 and router 306 can have a DIA exit and a WAN exit. As illustrated in FIG. 3, each of router 304 and router 306 can have three WAN tunnels (e.g., satellite connection 310, MPLS connection 312, and biz-internet connection 314). Further, each of router 304 and router 306 may have one or more DIA exits (e.g., DIA ISP1 316 and DIA ISP2 318). The states of the WAN tunnels (e.g., satellite connection 310, MPLS connection 312, and biz-internet connection 314) and the DIA paths (e.g., DIA ISP1 316 and DIA ISP2 318) can be used as the basis for determining whether to switch each router's state (e.g., from active to standby or from standby to active), which will be described in further detail below with reference to FIG. 4.

Figure 4:
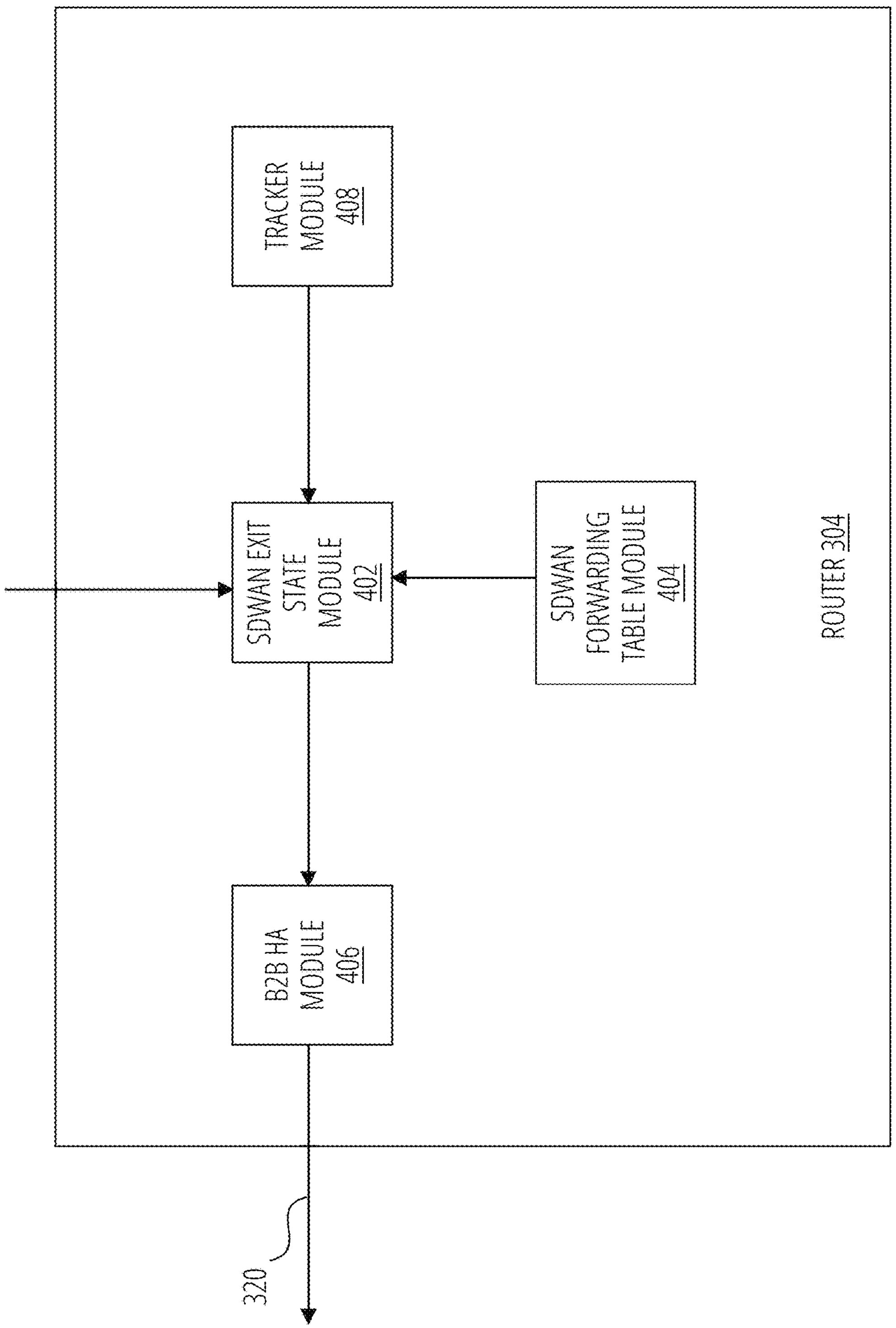
FIG. 4 illustrates an example router in accordance with some aspects of the present disclosure.

FIG. 4 illustrates an example router in accordance with some aspects of the present disclosure. While FIG. 4 describes example router 304 of FIG. 3, the same description can equally apply to router 306. Router 304 can include an SDWAN exit state module 402, SDWAN forwarding table module 404, B2B HA module 406, and tracker module 408. For example, these modules can be stored in a memory of router 304 and executed by a processor of router 304.

SDWAN forwarding table module 404 can access tunnel bidirectional forwarding detection (BFD) states to determine whether the WAN tunnels of router 304 are available (e.g., satellite connection 310, MPLS connection 312, and/or biz-internet connection 314). This information can, for example, be stored in a forwarding table of router 304.

Tracker module 408 can maintain one or more tracking objects that can be used to determine or track the DIA path states (e.g., DIA ISP1 316 and/or DIA ISP2 318). SDWAN forwarding table module 404 and tracker module 408 can track the states of the WAN tunnels and DIA paths of router 304 in real-time, and can communicate these states to SDWAN exit state module 402.

SDWAN exit state module 402 can, in some examples, determine the WAN tunnel exit status and the DIA path exit status of router 304. In some examples, each status is determined based on one or more criteria received at and stored by SDWAN exit state module 402, e.g., from a system administrator. An example set of criteria for determining a WAN exit status of "available" can be: at least one WAN tunnel is up; preferred path such as MPLS connection 312 is available (even if other tunnels are down); and hub 302 is reachable (e.g., if hub 302 is a critical servicing homing hub). In another example, a set of criteria for determining that the DIA path exit status is "available" can be: at least one DIA path is up; and a particular SaaS application is reachable via either DIA ISP1 316 or DIA ISP2 318.

By using the tunnel and path states tracked by SDWAN forwarding table module 404 and tracker module 408, SDWAN exit state module 402 can determine whether its local WAN tunnel exit status is "available" or "unavailable," and whether its local DIA path exit status is "available" or "unavailable." This information can be transmitted, via HA interconnect 320 by B2B HA module 406, to other router (e.g., router 306). For example, router 304 may transmit a hello packet or keepalive containing its WAN tunnel exit status and DIA path exit status to router 306. Additionally, router 306 can similarly determine its own WAN tunnel exit status and DIA path exit status, and transmit that information, via HA interconnect 320, to router 304. Thus, after such an exchange, each of router 304 and router 306 has information indicating its own WAN tunnel exit status and DIA path exit status and the other router's WAN tunnel exit status and DIA path exit status.

By knowing the status of the local and far-end exits, the HA state (e.g., active or standby) can be influenced by comparing the deterministic local and far-end status of the SDWAN exits. Thus, priority thresholds may no longer need to be specified and heuristics may no longer be relied upon to influence switchover, unlike existing mechanism described earlier. Example algorithm used to determine switchover based on local and far-end exit statuses is described in further detail below with reference to FIG. 5.

Figure 5:
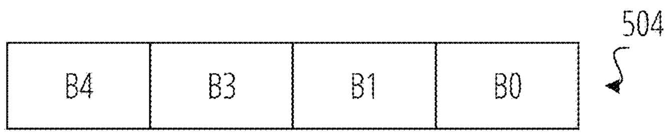
FIG. 5 illustrates an index table for controlling HA switchover for SDWAN in accordance with some aspects of the present technology.

FIG. 5 illustrates an index table for controlling HA switchover for SDWAN in accordance with some aspects of the present technology. Example index table 502 may be used for determining an HA state of router 304. Each of router 304 and router 306 may store an identical index table as index table 502, thereby enabling each router to independently reach the same outcome based on the respective local and far-end exit statuses using the same algorithm.

Index table 502 may store a far-end WAN tunnel status, a far-end DIA path status, a local WAN tunnel status, and a local DIA path status. Each status can be represented and stored as a binary value where a one corresponds to a status of "available" and a 0 corresponds to a status of "unavailable." Index table 502 may also include a bitmap 504 mapping each possible combination of statuses to an HA role. The HA role can define the state of each of router 304 and router 306 (e.g., active or standby). For example, the HA role can define router 304 (R1) as the active router and router 306 (R2) as the standby router, and the HA' role can define router 304 (R1) as the standby router and router 306 (R2) as the active router.

When router 304 determines its local WAN tunnel exit status and DIA path exit status, and receives, from router 306, the far-end WAN tunnel exit status and DIA path exit status, router 304 can compile a bitmap 504 where B4 maps to the far-end WAN tunnel status, B3 maps to the far-end DIA path status, B1 maps to the local WAN tunnel exit status, and B0 maps to the local DIA path exit status. Bitmap 504 can then be used to identify the appropriate final role defining the state of router 304.

In an illustrative and non-limiting example, router 304 can determine, using SDWAN exit state module 402, a local WAN tunnel exit status of "available" and a local DIA path exit status of "unavailable." Router 304 may also receive from router 306, e.g., in a hello packet via HA interconnect 320, an indication of the far-end WAN tunnel status being "unavailable" and the far-end DIA path exit status being "available." In response, router 304 would generate a bitmap 504 of "1001," or "9." Index table 502 can map the value of bitmap 504 to the role of HA' Role. Thus, if router 304 is currently active, router 304 will switch to standby.

Similarly, after receiving the statuses from router 304, router 306 may use an identical index table as index table 502 to reach the same final role to determine that router 306's state should switch to active. Accordingly, each of router 304 and router 306 can determine locally whether a switchover should occur based on local and far-end exit statuses.

Figure 6:
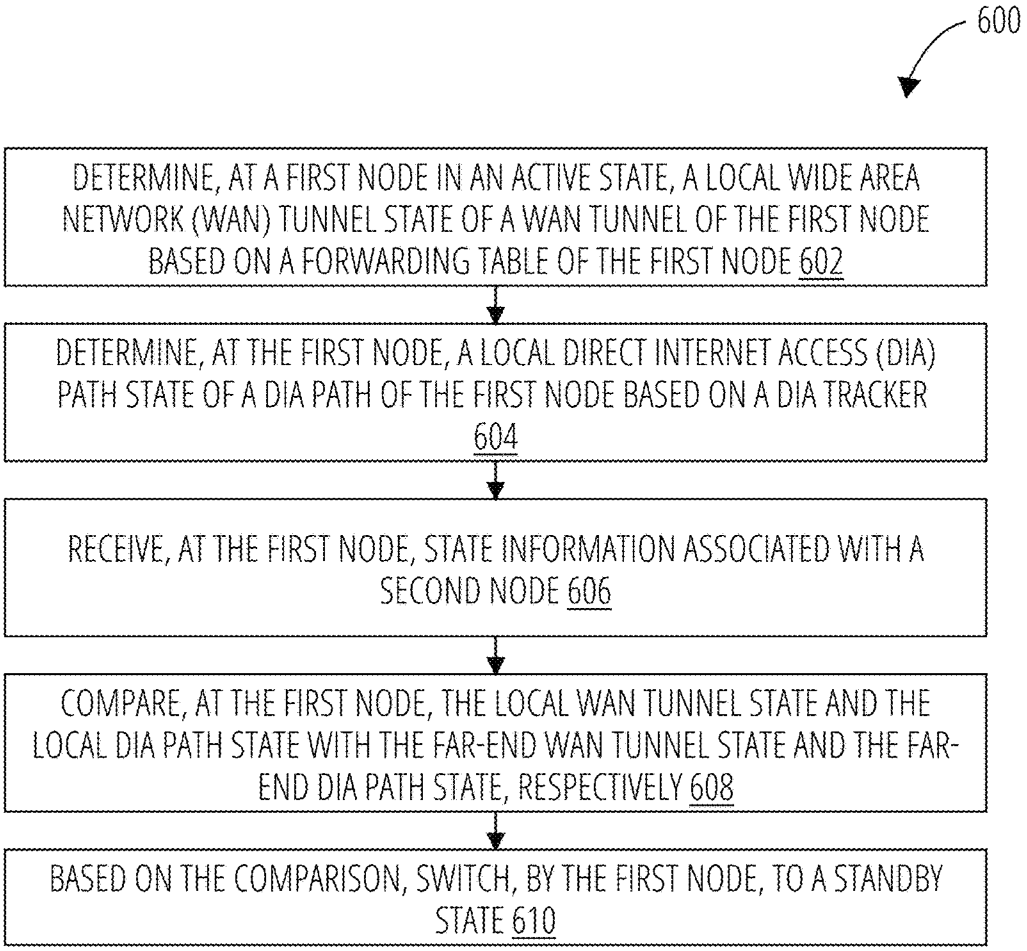
FIG. 6 illustrates an example of an SDWAN HA switchover method in accordance with some aspects of the present disclosure.

FIG. 6 illustrates a, example of an SDWAN HA switchover method in accordance with some aspects of the present disclosure. More specifically, FIG. 6 illustrates an example method 600 for determining, by a router in an HA cluster, whether switchover should occur based on local and far-end exit statuses. A router can be, for example, router 304 in an HA cluster with router 306 such as environment 300 (cluster) as described above with reference to FIG. 3. The HA cluster may be in communication network 100, network architecture 200, etc.

FIG. 6 will be described from the perspective of active router. It should be understood that such active router may have one or more memories having computer-readable instructions stored therein and one or more processors configured to execute the computer-readable instructions to perform steps of method 600 described below.

Furthermore, while router 304 is used below as an example of a first node in the active state, method 600 can equally be performed from the perspective of router 306 in active state and/or any other router in a cluster/network that is in an active state.

In block 602, method 600 includes determining, at a first node (e.g., router 304) in an active state, a local WAN tunnel state of a WAN tunnel of the first node based on a forwarding table of the first node. The first node can be, a first router of the HA cluster (e.g., router 304 in environment 300). As discussed above, SDWAN forwarding table module 404 can be used to track BFD states associated with router 304. SDWAN exit state module 402 can receive the states from SDWAN forwarding table module 404 and determine, based on one or more criteria, the local WAN tunnel state.

In block 604, method 600 includes determining, at the first node, a local DIA path state of a DIA path of the first node based on a DIA tracker. The DIA tracker can be, for example, tracker module 408. SDWAN exit state module 402 can receive the DIA path states from tracker module 408 (e.g., for DIA ISP1 316 and/or DIA ISP2 318) and determine the local DIA path state. For example, the local DIA path state can be based on one or more criteria for determining whether the local DIA path exit state is "available" or "unavailable."

In block 606, method 600 includes receiving, at the first node, state information associated with a second node (may also be referred to as a remote router, a far-end router, and/or a connected router). The state information includes a far-end WAN tunnel state and a far-end DIA path state. For example, the second node can be router 306, which can transmit its local exit statuses via HA interconnect 320. The local statuses of router 306 can be received at router 304 (e.g., the first node) as far-end exit statuses. In some examples, simultaneously or in parallel, router 304 can transmit its local exit states to router 306 via HA interconnect 320. In some examples, the respective routers exchange states periodically, at predetermined intervals. In some examples, a router can be triggered to transmit its local states if a local exit state changes. For example, a router may periodically or dynamically update its local exit states. If a local exit state changes its value, the router may be triggered to transmit its local exit states to the other router, thereby triggering the other router to return its exit states and cause both routers to determine whether to switchover.

In block 608, method 600 includes comparing, at the first node, the local WAN tunnel state and the local DIA path state with the far-end WAN tunnel state and the far-end DIA path state, respectively. For example, router 304 can generate a bitmap mapping the combination of local and far-end exit states to a final role defining the state of each node in HA cluster (e.g., router 304 and router 306). The mapping can be stored, for example, in an index table 502 of router 304. Router 306 can store an identical index table as index table 502 such that router 306 can locally reach the same final role using its local exit statuses and the far-end exit statuses received from router 304.

In block 610, method 600 includes, based on the comparison, switching, by the first node, to a standby state. As discussed above, index table 502 can be used by router 304 to map bitmap 504 to a final role defining the states of router 304 and router 306 based on the combination of local and far-end exit states at each respective router.

Accordingly, method 600 can be used by router 304 and router 306 independently, such that both routers converge on the same switchover decision. Thus, by using criteria to determine exit availability and using exit availability to determine switchover, method 600 uses DIA and WAN reachability as the unit of granularity for switchover influence, rather than using individual failures like prefix unreachability and interface down. Unlike conventional methods, which use scores of individual failures to determine if another router is worse than a first router, method 600 facilitates more accurate switchover decisions, thereby improving SDWAN reliability.

Figure 7:
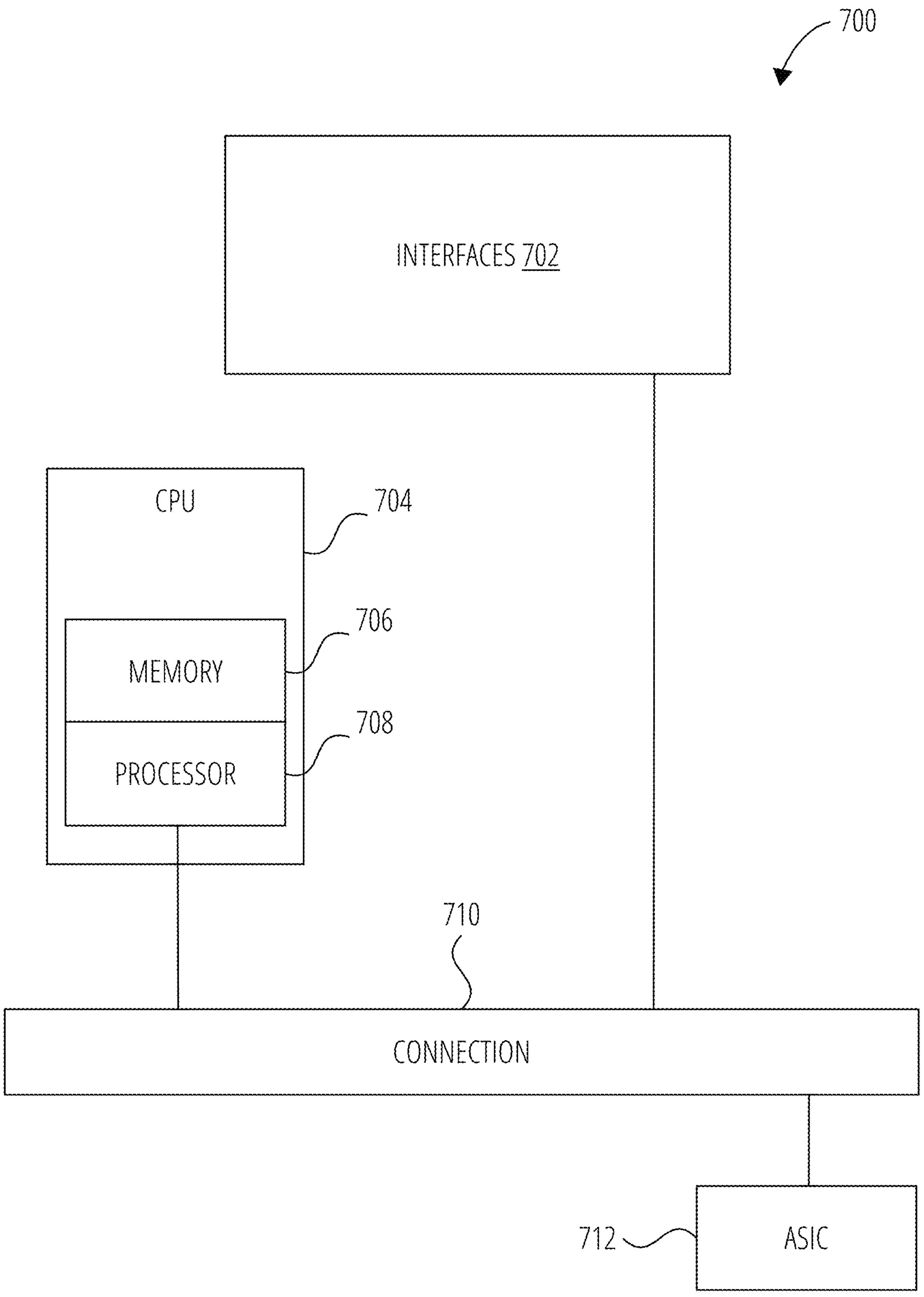
FIG. 7 illustrates an example network device in accordance with some aspects of the present disclosure.

FIG. 7 illustrates an example network device in accordance with some aspects of the present disclosure. Example network device 700 be any other device suitable for performing switching, routing, load balancing, and other networking operations. Example network device 700 for example correspond to router 304, router 306, components thereof, and/or any other element of communication network 100, network architecture 200, and/or environment 300 described above with reference to FIGS. 1-6.

Network device 700 includes a central processing unit (e.g., CPU 704), interfaces 702, and a bus 710 (e.g., a PCI bus). When acting under the control of appropriate software or firmware, CPU 704 is responsible for executing packet management, error detection, and/or routing functions. CPU 704 preferably accomplishes all these functions under the control of software including an operating system and any appropriate applications software. CPU 704 may include one or more processors such as processor 708. Processor 708 can be from the INTEL X86 family of microprocessors. In some cases, processor 708 can be specially designed hardware for controlling the operations of network device 700. In some cases, a memory 706 (e.g., non-volatile RAM, ROM, etc.) also forms part of CPU 704. However, there are many different ways in which memory could be coupled to the system.

Interfaces 702 are typically provided as modular interface cards (sometimes referred to as "line cards"). Generally, they control the sending and receiving of data packets over the network and sometimes support other peripherals used with network device 700. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LORA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., CPU 704) to efficiently perform routing computations, network diagnostics, security functions, etc.

Although the system shown in FIG. 7 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 706 could also hold various software containers and virtualized execution environments and data.

Network device 700 can also include an application-specific integrated circuit (e.g., ASIC 712), which can be configured to perform routing and/or switching operations. ASIC 712 can communicate with other components in network device 700 via bus 710, to exchange data and signals and coordinate various types of operations by network device 700, such as routing, switching, and/or data storage operations, for example.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:

determining, at a first node in an active state, a local wide area network (WAN) tunnel state of a WAN tunnel of the first node based on a forwarding table of the first node;

determining, at the first node, a local direct internet access (DIA) path state of a DIA path of the first node based on a DIA tracker;

receiving, at the first node, state information associated with a second node, wherein the state information includes a far-end WAN tunnel state and a far-end DIA path state associated with the second node;

comparing, at the first node, the local WAN tunnel state and the local DIA path state with the far-end WAN tunnel state and the far-end DIA path state of the second node, respectively to yield a comparison; and based on the comparison, switching, by the first node, to a standby state.

2. The method of claim 1, wherein the comparison is based on a state table that includes a set of roles defined by possible combinations of the local WAN tunnel state, the local DIA path state, the far-end WAN tunnel state, and the far-end DIA path state.

3. The method of claim 2, wherein comparing the local WAN tunnel state and the local DIA path state with the far-end WAN tunnel state and the far-end DIA path state of the second node comprises:

applying an algorithm that is uniform across the first node and the second node.

4. The method of claim 2, wherein the state table comprises an index table, wherein an index of the index table comprises a bitmap indexing possible combinations of the local WAN tunnel state, the local DIA path state, the far-end WAN tunnel state, and the far-end DIA path state.

5. The method of claim 1, further comprising:

transmitting, to the second node, local state information, wherein the local state information includes the local WAN tunnel state and the local DIA path state and wherein the local state information is useable by the second node to:

compare, at the second node, the local WAN tunnel state and the local DIA path state with the far-end WAN tunnel state and the far-end DIA path state, respectively, to yield a second comparison; and based on the second comparison, switch a state of the second node to an active state.

6. The method of claim 1, wherein the state information associated with the second node is received at the first node via a hello or a keepalive transmitted from the second node to the first node.

7. The method of claim 1, wherein the first node comprises an exit state evaluation module for determining the local wide area network (WAN) tunnel state and the local direct internet access (DIA) path state.

8. A router comprising:

at least one memory configured to store computer-readable instructions; and and one or more processors configured to execute the computer-readable instructions to:

determine a local wide area network (WAN) tunnel state of a WAN tunnel of the router based on a forwarding table of the router, the router being in an active state;

determine a local direct internet access (DIA) path state of a DIA path of the router based on a DIA tracker;

receive state information associated with a remote router, wherein the state information comprises a far-end WAN tunnel state and a far-end DIA path state of the remote router;

compare the local WAN tunnel state and the local DIA path state with the far-end WAN tunnel state and the far-end DIA path state of the remote router, respectively, to yield a comparison; and based on the comparison, switch the router to a standby state.

9. The router of claim 8, wherein the comparison is based on a state table that includes a set of roles defined by possible combinations of the local WAN tunnel state, the local DIA path state, the far-end WAN tunnel state, and the far-end DIA path state.

10. The router of claim 9, wherein the one or more processors are configured to execute the computer-readable instructions to compare the local WAN tunnel state and the local DIA path state with the far-end WAN tunnel state and the far-end DIA path state of the remote router by applying an algorithm, wherein the algorithm is uniform across the router and the remote router.

11. The router of claim 9, wherein the state table comprises an index table, wherein an index of the index table comprises a bitmap indexing possible combinations of the local WAN tunnel state, the local DIA path state, the far-end WAN tunnel state, and the far-end DIA path state.

12. The router of claim 8, wherein the one or more processors are configured to execute the computer-readable instructions to transmit, to the remote router, local state information, wherein the local state information includes the local WAN tunnel state and the local DIA path state and wherein the local state information is useable by the remote router to:

compare, at the remote router, the local WAN tunnel state and the local DIA path state with the far-end WAN tunnel state and the far-end DIA path state, respectively, to yield a second comparison; and based on the second comparison, switch a state of the remote router to an active state.

13. The router of claim 8, wherein the state information associated with the remote router is received at the router via a hello or a keepalive transmitted from the remote router to the router.

14. The router of claim 8, wherein the router comprises an exit state evaluation module for determining the local wide area network (WAN) tunnel state and the local direct internet access (DIA) path state.

15. One or more non-transitory computer-readable media comprising computer-readable instructions that, when executed by one or more processors of a router, cause the router to:

determine a local wide area network (WAN) tunnel state of a WAN tunnel of the router based on a forwarding table of the router, the router being in an active state;

determine a local direct internet access (DIA) path state of a DIA path of the router based on a DIA tracker;

receive state information associated with a remote router, wherein the state information comprises a far-end WAN tunnel state and a far-end DIA path state of the remote router;

compare the local WAN tunnel state and the local DIA path state with the far-end WAN tunnel state and the far-end DIA path state of the remote router, respectively, to yield a comparison; and based on the comparison, switch the router to a standby state.

16. The one or more non-transitory computer-readable media of claim 15, wherein the comparison is based on a state table that includes a set of roles defined by possible combinations of the local WAN tunnel state, the local DIA path state, the far-end WAN tunnel state, and the far-end DIA path state.

17. The one or more non-transitory computer-readable media of claim 16, wherein execution of the computer-readable instructions by the one or more processors further cause the router to compare the local WAN tunnel state and the local DIA path state with the far-end WAN tunnel state and the far-end DIA path state of the remote router by applying an algorithm, wherein the algorithm is uniform across the router and the remote router.

18. The one or more non-transitory computer-readable media of claim 16, wherein the state table comprises an index table, wherein an index of the index table comprises a bitmap indexing possible combinations of the local WAN tunnel state, the local DIA path state, the far-end WAN tunnel state, and the far-end DIA path state.

19. The one or more non-transitory computer-readable media of claim 15, wherein execution of the computer-readable instructions by the one or more processors further cause the router to transmit, to the remote router, local state information, wherein the local state information includes the local WAN tunnel state and the local DIA path state and wherein the local state information is useable by the remote router to:

compare, at the remote router, the local WAN tunnel state and the local DIA path state with the far-end WAN tunnel state and the far-end DIA path state, respectively, to yield a second comparison; and based on the second comparison, switch a state of the remote router to an active state.

20. The one or more non-transitory computer-readable media of claim 15, wherein the state information associated with the remote router is received at the router via a hello or a keepalive transmitted from the remote router to the router.

* * * * *